(12) United States Patent
Harlocker

(10) Patent No.: US 7,303,077 B2
(45) Date of Patent: Dec. 4, 2007

(54) CARRYING CASE PROVIDING PRIVACY AND LIGHT SHADE FOR A SCREEN OF A LAPTOP COMPUTER

(76) Inventor: Christopher R. Harlocker, 237 Noble Ave., Lake Forest, IL (US) 60045

( * ) Notice: Subject to any disclaimer, the term of this patent is extended or adjusted under 35 U.S.C. 154(b) by 862 days.

(21) Appl. No.: 10/803,824

(22) Filed: Mar. 18, 2004

(65) Prior Publication Data
US 2005/0205444 A1   Sep. 22, 2005

(51) Int. Cl.
*G02B 27/00* (2006.01)
*B65D 85/00* (2006.01)
(52) U.S. Cl. ............ 206/576; 206/320; 359/601; 359/609; 248/205.2; 248/918; 312/208.3
(58) Field of Classification Search .......... 206/320, 206/576; 359/601, 609; 240/205.2, 918; 312/208.3
See application file for complete search history.

(56) References Cited

U.S. PATENT DOCUMENTS

| | | | | |
|---|---|---|---|---|
| 5,218,474 A | * | 6/1993 | Kirschner | 359/601 |
| 5,325,970 A | * | 7/1994 | Dillon et al. | 206/576 |
| 5,762,250 A | * | 6/1998 | Carlton et al. | 224/579 |
| 5,877,896 A | * | 3/1999 | Gremban | 359/601 |
| 5,992,155 A | | 11/1999 | Kobayashi et al. | |
| 5,997,145 A | * | 12/1999 | Mora | 359/609 |
| 6,084,711 A | * | 7/2000 | Duff | 359/601 |
| 6,109,434 A | | 8/2000 | Howard | |
| 6,144,419 A | * | 11/2000 | Schmidt | 348/842 |
| 2003/0223119 A1 | * | 12/2003 | Heiman | 359/610 |

* cited by examiner

*Primary Examiner*—Mickey Yu
*Assistant Examiner*—Jerrold Johnson
(74) *Attorney, Agent, or Firm*—Pandiscio & Pandiscio; Scott R. Foster

(57) ABSTRACT

A carrying case providing privacy and light shade for a screen of a laptop computer disposed therein. The carrying case includes top and bottom portions movable between closed and open positions, and panels disposed on the interior surface of the case top portion and pivotally movable from flush with the top portion interior surface to form an inverted u-shaped shroud resting on the interior surface of the case bottom portion. The case top and bottom portions, and panels form a five sided cavity, a sixth side being open to permit viewing of the screen of the computer by an operator.

16 Claims, 5 Drawing Sheets

CARRYING CASE PROVIDING PRIVACY AND LIGHT SHADE FOR A SCREEN OF A LAPTOP COMPUTER

BACKGROUND OF THE INVENTION

1. Field of the Invention

This invention relates to carrying cases for laptop computers and is directed more particularly to such a case having facility for providing privacy and light shade for the screen of the computer during use of the computer in the carrying case.

2. Description of the Prior Art

It is customary for many travelers, particularly business travelers, to carry a laptop computer and to use the computer in the course of traveling by air, train, automobile or bus and while waiting to board the vehicle of choice. It often happens that travelers find themselves in close quarters with other travelers and do not wish to have onlookers reading their computer screen. Further, travelers often have no control over nearby windows and electric lights and suffer from glare on the computer screen.

Thus, there is a need for a privacy and light shade which would allow the traveler to use a laptop computer with sunshine or other light blocked from impinging on the computer screen, and with the screen removed from the sight of casual onlookers.

There is further a need for the aforementioned privacy and light shade which does not constitute a separate "carry on" article, but rather is integral with the carrying case in which the computer resides.

SUMMARY OF THE INVENTION

An object of the invention is, therefore, to provide a carrying case for a laptop computer, the case having integral therewith a privacy and light shade readily and easily movable between a stowed position within the carrying case to a position extended from the case and providing a shroud around the computer screen for purposes of privacy and protection against glare.

With the above and other objects in view, a feature of the invention is the provision of a carrying case providing privacy and light shade for a screen of a laptop computer disposed therein. The carrying case includes top and bottom portions movable between closed and open positions, and panels disposed flush on the interior surface of the case top portion and pivotally movable from the top portion to form an inverted u-shaped shroud resting on the interior surface of the case bottom portion. The case top and bottom portions and the panels form a five sided cavity, a sixth side being open to permit viewing of the screen of the computer by the operator.

In accordance with a further feature of the invention, there is provided a carrying case providing privacy and light shade for a screen of a laptop computer. The carrying case includes a case bottom and a case top hingedly connected to each other along back portions thereof and movable between open and closed positions. Connection structure is disposed along front and side portions of the case for locking the front and side portions of the case top to front and side portions of the case bottom when the case is closed, the connection structure being releasable to permit the case top to move away from the case bottom to a location generally normal to the case bottom. A central panel is pivotally attached along a top edge of an inside surface of the case top, the central panel being adapted to lie flush with the inside surface of the case top. First and second side panels are pivotally connected to the central panel, such that the side panels are adapted to lie flush with the central panel and adapted to be moved pivotally away from the central panel to positions generally normal to the central panel. Upon opening the case and moving the case top to the position generally normal to the case bottom, the central panel and the first and second side panels are pivotally movable inwardly from the case top to position the central panel substantially parallel with the case bottom. The first and second side panels are then movable downwardly and outwardly with free ends of the side panels being engageable with an inner surface of the case bottom, with the side panels in the positions generally normal to the central panel and generally normal to the case bottom. The case bottom, case top, central panel, and side panels thereby form a five sided cavity, a sixth side being open for viewing of the computer screen disposed within the cavity.

In accordance with a further feature of the invention, there is provided in combination, a laptop computer and a carrying case therefor. The combination includes a laptop computer which, in turn, includes a keyboard portion and a viewing screen portion, the keyboard portion and the viewing screen portion being hingedly connected at rear edges thereof, such that the viewing screen portion is movable to a position generally normal to the keyboard portion. The combination further includes a carrying case retaining the computer, the carrying case including top and bottom portions movable between closed and open positions, and panels adapted to be disposed flush on an interior surface of the top portion and pivotally movable from the top portion to form an inverted u-shaped shroud resting on an interior surface of the bottom portion. The top and bottom portions and the panels are adapted to thereby form a five-sided cavity. The computer screen portion is movable in the cavity from a closed position to the position generally normal to the keyboard portion and proximate the case top portion. The shroud is open on a sixth side to permit viewing of the computer screen portion by an operator, while the shroud provides privacy and light shade.

In accordance with a still further feature of the invention, there is provided in a method for operating a laptop computer with the screen thereof shielded for privacy and prevention of glare. The method includes the steps of providing in combination, a laptop computer and a carrying case therefor. The combination includes a laptop computer having a keyboard portion and a viewing screen portion. The keyboard portion and the viewing screen portion are hingedly connected at rear edges thereof, such that the viewing screen portion is movable to a position generally normal to the keyboard portion. The combination further includes a carrying case retaining the computer, the carrying case housing top and bottom portions movable between closed and open positions, and panels adapted to be disposed flush on an interior surface of the top portion and pivotally movable from the top portion to form an inverted u-shaped shroud resting on an interior surface of the bottom portion, the top and bottom portions and the panels being adapted to thereby form a five-sided cavity. The method further includes the steps of opening the case and moving the top portion thereof to a position upstanding from the bottom portion, moving the panels from the position flush with the interior surface of the top portion to positions wherein a central panel extends substantially parallel with the bottom portion, and side panels at either end of the central panel to positions generally normal to the bottom portion, whereby to form a shroud closed on five sides of the computer, and moving the computer screen portion away from the computer keyboard portion and toward the case top portion, the shroud being open on a sixth side to permit viewing of the computer screen portion by an operator, while the shroud provides privacy and protection from glare.

The above and other features of the invention, including various novel details of construction and combinations of parts, will now be more particularly described with reference to the accompanying drawings and pointed out in the claims. It will be understood that the particular device, combination, and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
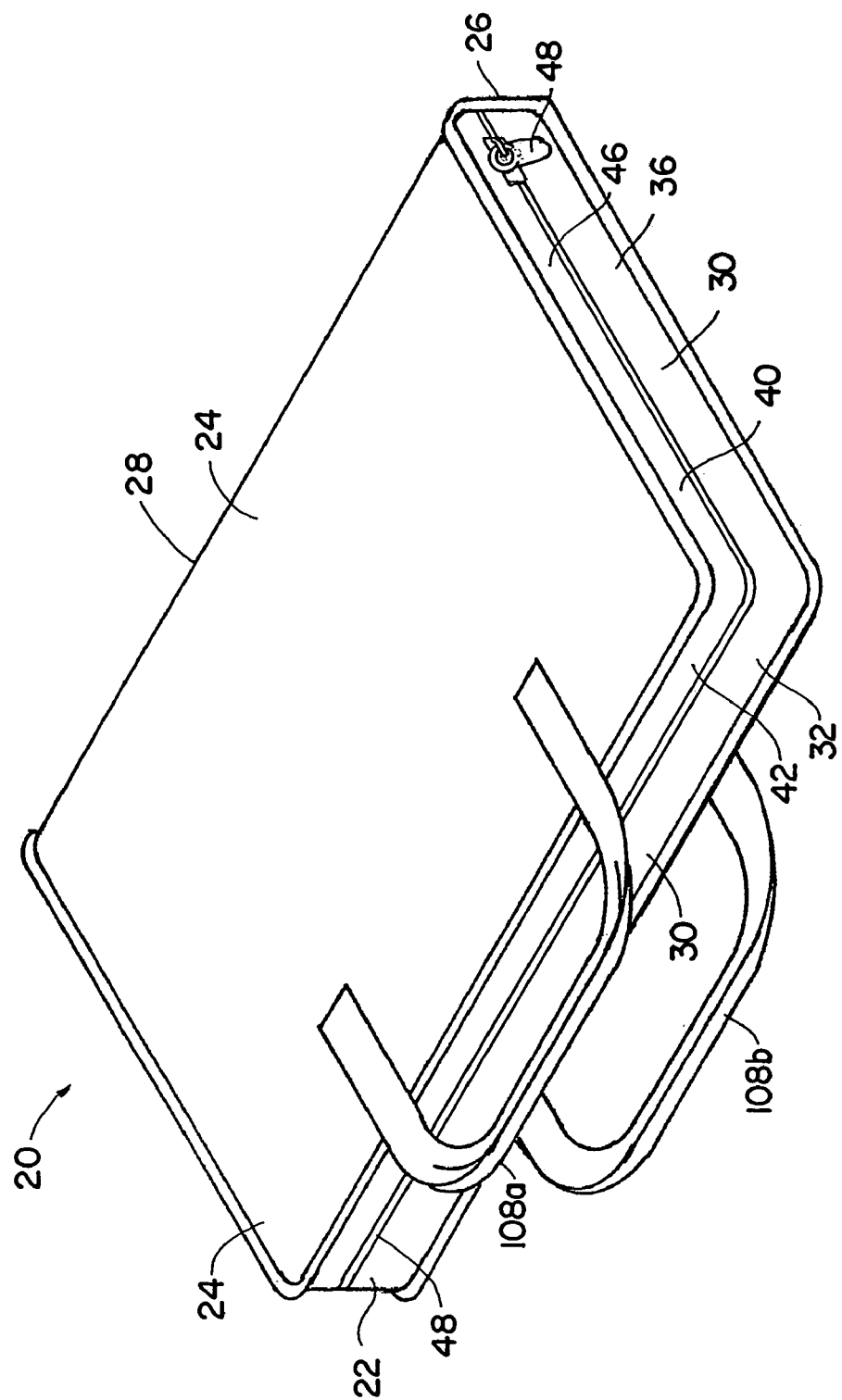
FIG. 1 is a perspective view of a carrying case for a laptop computer, the case being shown in a closed condition.
Figure 2:
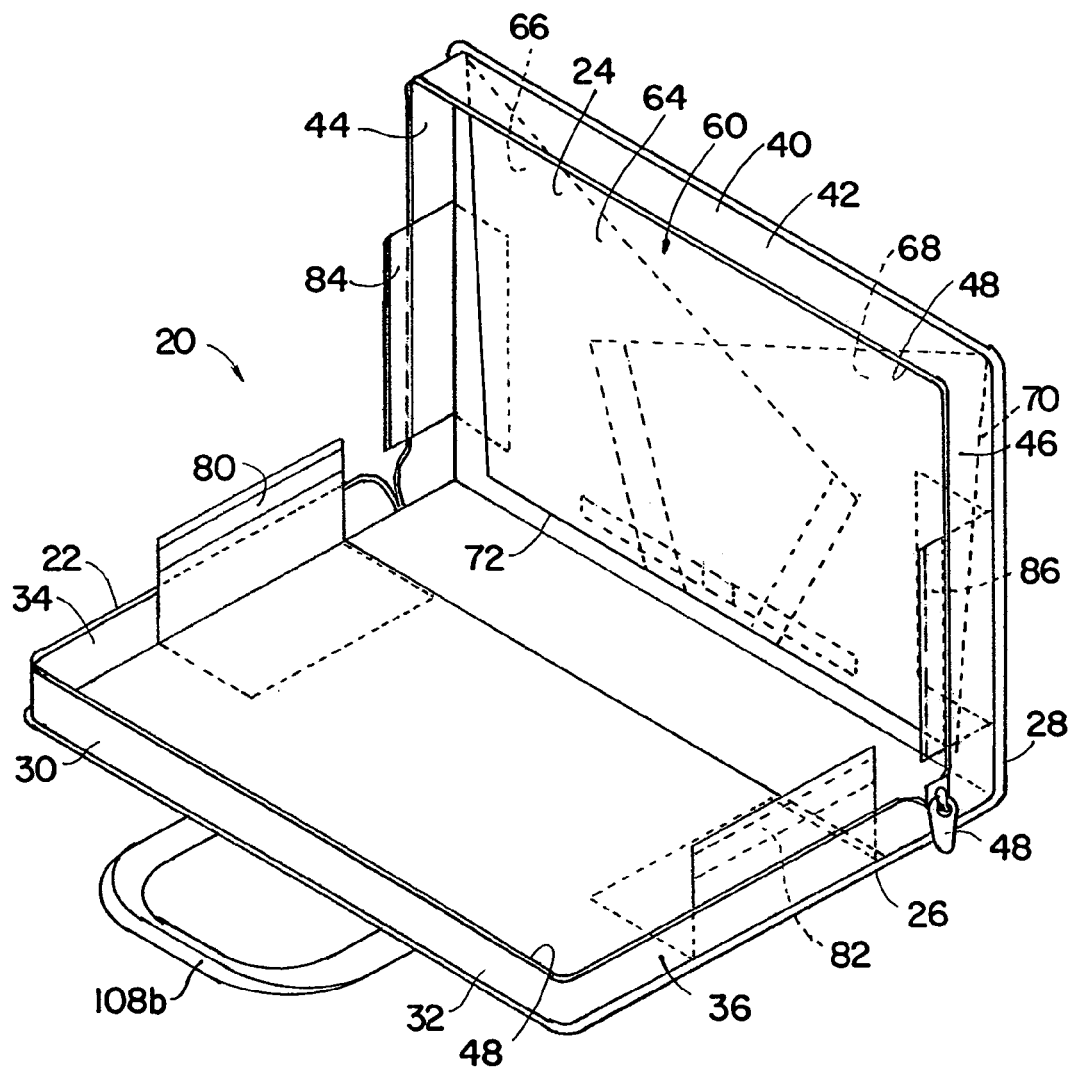
FIGS. 2-4 are perspective views of the case of FIG. 1, showing sequential steps in opening the case and setting up the privacy and light shade structure, and illustrations of an embodiment of the invention.
Figure 3:
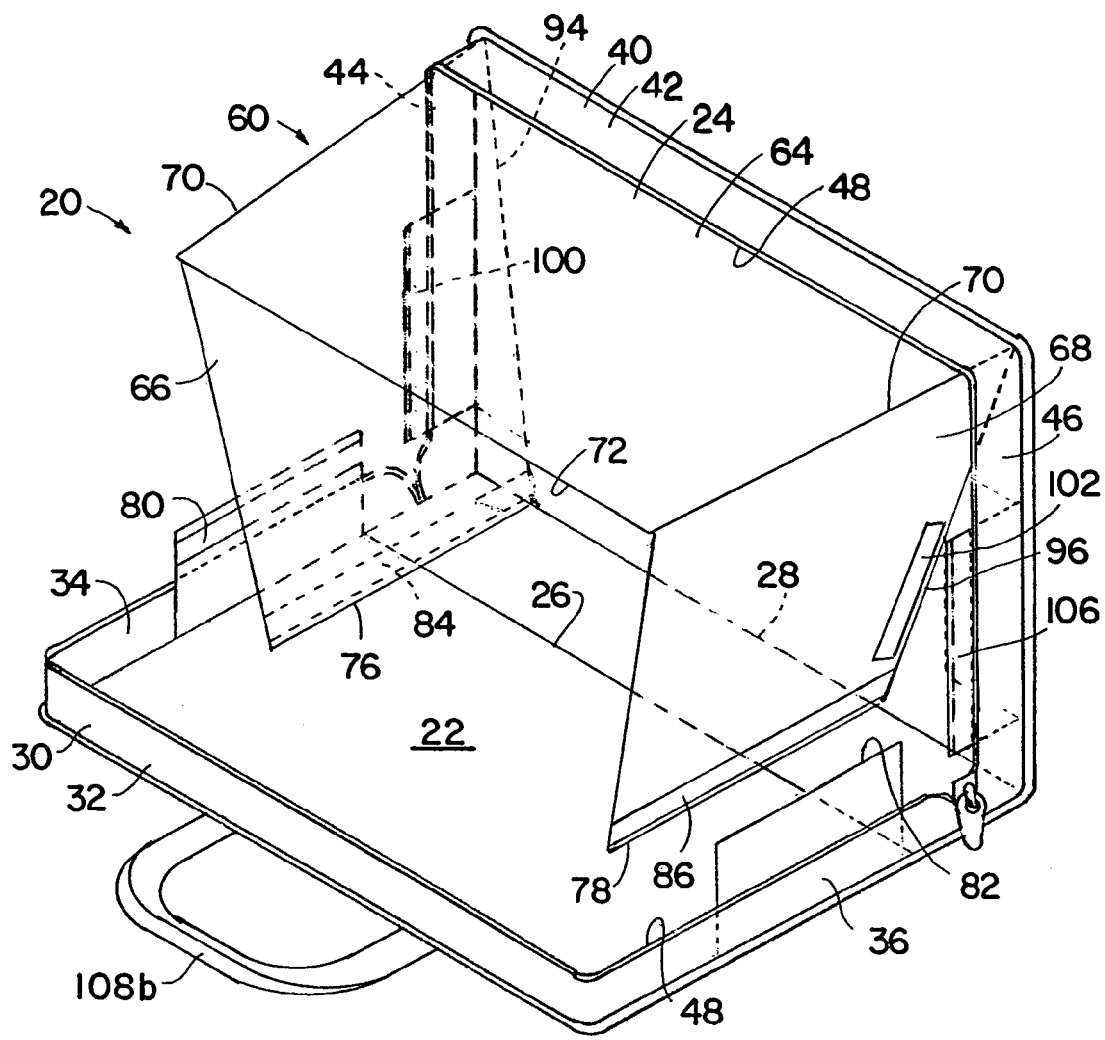
Figure 4:
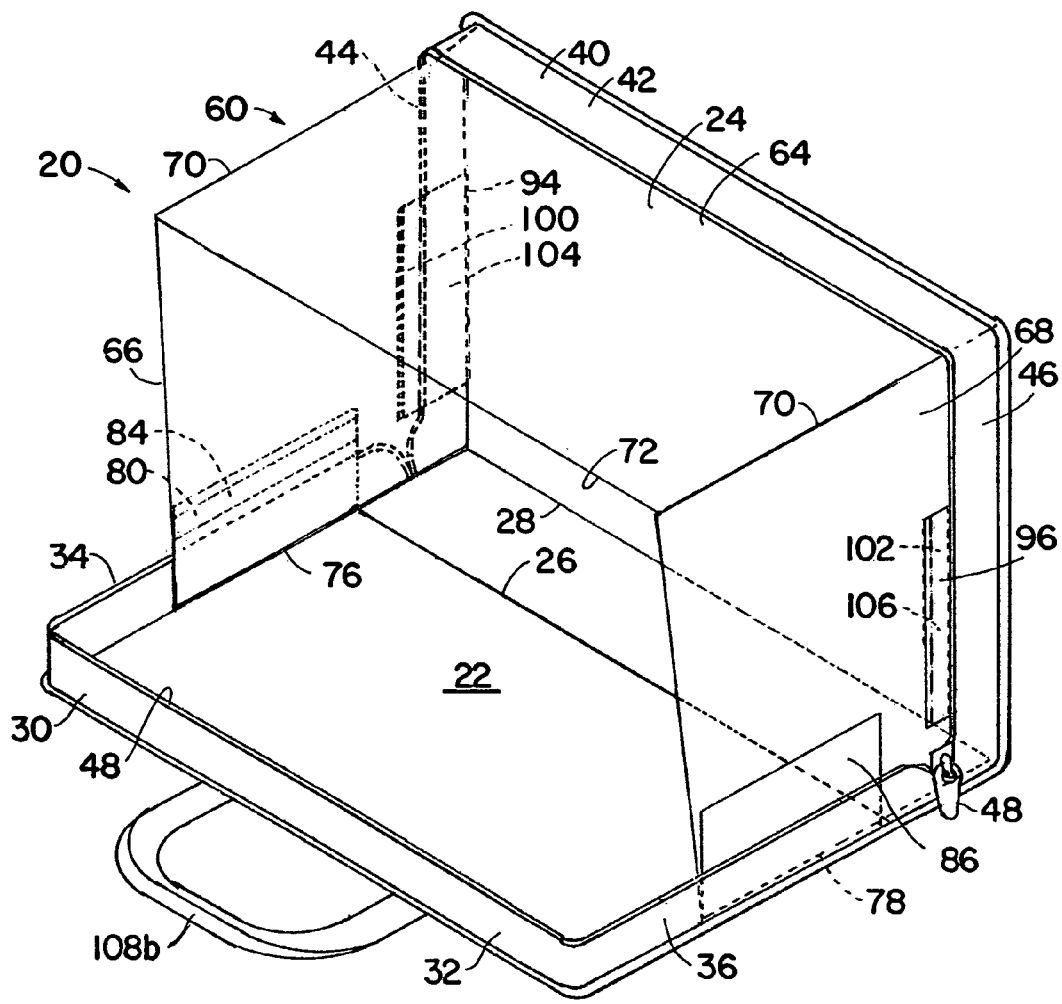
Figure 5:
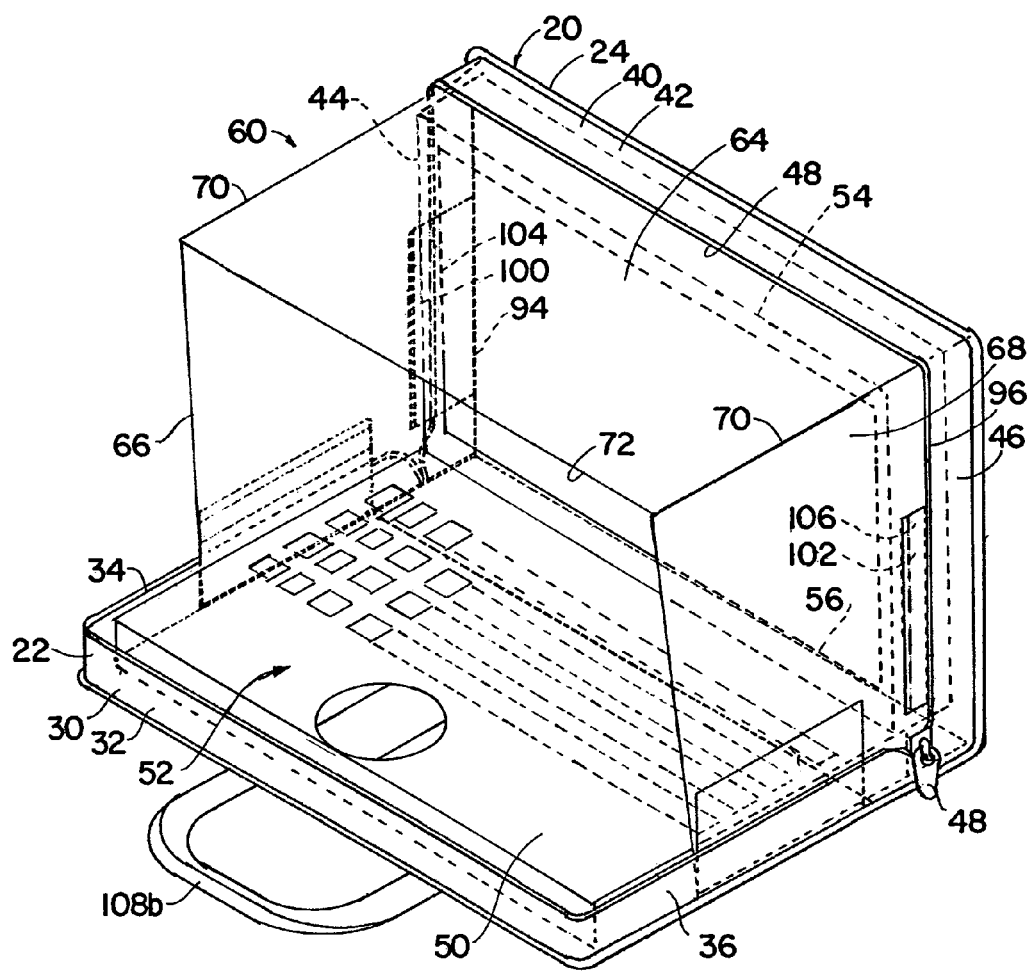
FIG. 5. is a perspective view of the carrying case of FIG. 4 shown in combination with a laptop computer disposed therein.

Referring to FIG. 1, it will be seen than an illustrative carrying case 20 includes a bottom portion 22 and a top portion 24 hingedly connected together along back portions 26, 28 thereof. The bottom portion 22 is provided with an upstanding lip 30 at a front portion 32 and end portions 34, 36 thereof. Similarly, the top portion 24 is provided with a lip 40 at a front portion 42 and end portions 44, 46 thereof. The lips 30, 40 are each provided with a readily releasable connection structure 48, such as a zipper or loop locks (not shown) for locking the bottom portion 22 and top portion 24 together for carrying an enclosed laptop computer 50, and for unlocking the top portion 24 from the bottom portion 22 to permit opening of the case 20 in order to use the computer 50.

The computer 50 is nestled in the bottom portion 22 of the carrying case 20, surrounded by the lips 30, 40 and the back portions 26, 28 and, when the case is closed, sandwiched between the case top and bottom portions 24, 22.

The computer 50 includes a keyboard portion 52 and a screen portion 54 which are hingedly connected along back edges 56 thereof, such that the screen portion can be pivotally moved to a position upstanding from the keyboard portion 52, in known fashion.

A panel assembly 60 is adapted to lie flush with the case top portion 24. The panel assembly 60 includes a central panel 64 and two side panels 66, 68 hingedly connected, as by living hinges 70, to opposite sides of the central panel 64.

In operation, the connection structure 48 is manipulated to unlock the case top portion 24 from the case bottom portion 22. The top portion 24 is pivoted upwardly about the back portion 28, until the top portion 24 is upstanding from the bottom portion 22, at a position generally normal to the bottom portion.

A first edge 72 of the panel assembly 60 is then lifted from the case top portion. The first edge 72 of the panel assembly is raised by pivotal movement about an opposite edge to a position generally parallel to the bottom portion 22. The two side panels 66, 68 thereupon fall downwardly, the free ends 76, 78 thereof engaging the bottom portion 22 and upstanding therefrom generally normal to the bottom portion.

The bottom portion 22 is provided with bottom fasteners 80, 82 each near an end lip 34, 36 of the bottom portion. The side panels 66, 68 are each provided with an end fastener 84, 86 proximate the free ends 76, 78 thereof. The bottom fasteners 80 and 82 are engageable, respectively, with the free end fasteners 84, 86 to lock the side panel free ends 76, 78 to the case bottom portion 22.

Similarly, the side panel back edges 94, 96 are provided with fasteners 100, 102 respectively engageable with fasteners 104, 106 on the case top portion 24 to secure the side panel back edges 94, 96 to the case top portion. Preferably, the fasteners 100, 102, 104 and 106 are strips of hermaphroditic material (such as Velcro®), but may alternatively be snap fasteners or other types, as desired.

In further operation, after the shroud is established as described above, the fasteners 80 and 84 are connected together, the fasteners 82 and 86 are connected together, as are the fasteners 100 and 104, and the fasteners 102 and 106.

The panel assembly 60 thus forms an inverted u-shaped shroud which in conjunction with the case bottom and top portions 22, 24, provides a five sided cavity, open on the sixth side for viewing the screen portion 54 of the computer.

Once the cavity is established, the computer screen portion 54 is raised from overlying the computer keyboard portion 52 to an upright position, upstanding from the keyboard portion and proximate and generally parallel to top portion 24.

The case top and bottom portions preferably are of internal construction making the top and bottom portions stiff, though the external material is preferably of a padded material, or leather, or otherwise soft material. The panels 64, 66, 68 are also preferably of a stiff internal construction with the exterior thereof, particularly the surface internal to the cavity formed thereby, of a non glare, non reflective matt material, preferably of a black or other dark color.

The carrying case 20 is provided with a loop handle 108, preferably including a loop 108a, 108b on each of the case bottom and top portions 22, 24.

There is thus provided a carrying case for a laptop computer, the case having integral therewith a privacy and light shade easily movable between a position stowed within the case and a position extended from the case and providing a shroud around the computer screen for privacy and light shade.

It will be understood that many additional changes in the details, materials, steps, and arrangements of parts, which have been herein described and illustrated in order to explain the nature of the invention, may be made by those skilled in the art within the principles and scope of the invention or expressed in the appended claims.

What is claimed is:

1. A carrying case providing privacy and light shade for a screen of a laptop computer disposed therein, the carrying case comprising top and bottom portions movable between closed and open positions, and panels adapted to be disposed flush on an interior surface of said case top portion and pivotally movable from said case top portion to form an inverted u-shaped shroud resting on an interior surface of said case bottom portion, wherein said panels comprise a central panel, and a side panel on each end of said central panel, a strip mounted on each side of said case bottom portion, each of said strips being adapted to lie flush with the interior surface of said case bottom portion, and adapted to be raised so as to stand on one lengthwise edge attached to said case bottom portion, each of said strips being provided with a first hermaphroditic fastener on one side thereof, and said side panels each having a strip at a free end thereof, said side panel strips each having a second hermaphroditic fastener thereon, the first and second hermaphroditic fasteners being engageable to lock the free ends of said side panels to said case bottom portion, said case top and bottom portions and said panels forming a five sided cavity, a sixth side being open to permit viewing of the screen of the computer.

2. The carrying case in accordance with claim 1 wherein said side panels are hingedly connected to the central panel ends.

3. The carrying case in accordance with claim 2 wherein said side panels are adapted to pivot inwardly to overlap each other.

4. The carrying case in accordance with claim 3 wherein said side panels when hingedly moved inwardly to overlap each other, overlie said central panel, said side panels being closer to said case top portion than said central panel.

5. The carrying case in accordance with claim 1 wherein at least one of said case top and bottom portions is provided with a loop handle.

6. The carrying case in accordance with claim 1 wherein said side panels are each provided with an edge strip disposed along an outboard surface thereof on an edge proximate the case top portion when the side panels are in their cavity forming positions, and the case top portion is provided with side strips on the interior thereof, each side strip proximate an end edge of the case top portion, the strips having hermaphroditic fastener material thereon, and the side panel edge strips are engageable with the case top portion side strips to lock the side panel outboard surface edges to the case top portion end edges.

7. The carrying case in accordance with claim 6 wherein the fasteners are engaged and separated by manually pressing two of the fasteners together and pulling two of the fasteners apart, respectively.

8. The carrying case in accordance with claim 1 wherein said top and bottom portions are each provided with a lip portion upstanding along the free front edge and side edge portions thereof, the lip portion being provided with releasable connection structure for locking the lip portions together to lock said case top portion to said case bottom portion to effect locking closure of the case.

9. The carrying case in accordance with claim 8 wherein the releasable connection structure comprises at least one zipper.

10. The carrying case in accordance with claim 1 wherein interior surfaces of said shroud panels are of a non-glare, non-reflective, material.

11. The carrying case in accordance with claim 4 wherein said top and bottom portions are internally of generally stiff construction, covered externally with a soft outer material.

12. The carrying case in accordance with claim 11 wherein said panels are internally of generally stiff construction, covered by a non-glare, non-reflective matt material.

13. The carrying case in accordance with claim 2 wherein said side panels are connected to said central panel by living hinges and said side panels and said central panel are generally stiff.

14. A carrying case providing privacy and light shade for a screen of a laptop computer disposed therein, the carrying case comprising:
a case bottom and a case top hingedly connected to each other along back portions thereof and movable between open and closed positions;
connection structure disposed along outer portions of the case for locking said case top to said case bottom when the case is closed, said connection structure being releasable to permit said case top to move away from said case bottom to a location generally normal to said case bottom;
a central panel pivotally attached along a top edge thereof to an inside surface of said case top, said central panel being adapted to lie flush with an inside surface of the case top;
first and second side panels pivotally connected to said central panel, such that said side panels are adapted to lie flush with said central panel and adapted to be moved pivotally away from said central panel to positions generally normal to said central panel;
whereby upon opening the case and moving said case top to the position generally normal to said case bottom, said central panel and said first and second side panels are pivotally movable inwardly from said case top to position said central panel substantially parallel with said case bottom;
the first and second side panels being then movable downwardly and outwardly with free ends of said side panels being engageable with an inner surface of said case bottom with said side panels in positions generally normal to said central panel and normal to said case bottom;
said case bottom, said case top, said central panel, and said side panels thereby forming a five sided cavity, a sixth side being open for viewing the computer screen disposed within the cavity;
wherein said case bottom and top and said side panels are provided with hermaphroditic fasteners engageable to fasten a first side panel to a first end of said case bottom, a second side panel to a second end of said case bottom, a rear edge of said first side panel to a first end portion of said case top, and a rear edge of said second side panel to a second end portion of said case top, whereby to lock the case bottom and top and said side panels together forming the five sided cavity; and
wherein the fasteners include a strip mounted on each side of said case bottom portion, each of said strips being adapted to lie flush with the interior of said case bottom portion, and adapted to be raised so as to stand on one lengthwise edge attached to said case bottom portion.

15. The carrying case in accordance with claim 14 wherein said side panels are attached to said central panel by living hinges and said side and central panels are of generally stiff construction.

16. In combination, a lap top computer and a carrying case therefor, the combination comprising:
a laptop computer comprising:
a keyboard portion;
a viewing screen portion;
the keyboard portion and the viewing screen portion being hingedly connected at rear edges thereof, such that the viewing screen portion is movable to a position upstanding from the keyboard portion; and a carrying case retaining said computer, said carrying case comprising:
- top and bottom portions movable between closed and open positions; and
- panels adapted to be disposed flush on an interior surface of said top portion and pivotally movable from said top portion to form an inverted u-shaped shroud resting on an interior surface of said bottom portion, said top and bottom portions and said panels being adapted to thereby form a five-sided cavity;
- wherein said case bottom and top and said side panels are provided with hermaphroditic fasteners engageable to fasten a first side panel to a first end of said case bottom, a second side panel to a second end of said case bottom, a rear edge of said first side panel to a first end portion of said case top, and a rear edge of said second side panel to a second end portion of said case top, whereby to lock the case bottom and top and said side panels together forming the five sided cavity;
- wherein the fasteners include a strip mounted on each side of said cae bottom portion, each of said strips being adapted to lie flush with the interior of said case bottom portion, and adapted to be raised so as to stand on one lengthwise edge attached to said case bottom portion;

said computer screen portion being movable in the cavity from a closed position to the position upstanding from said keyboard portion and proximate said case top portion; and the shroud being open on a sixth side to permit viewing of said computer screen portion by an operator, while the shroud provides privacy and light shade.

* * * * *